June 14, 1927.

H. M. WHITE 1,632,719

OVEN DOOR

Filed July 19, 1926

Inventor
Harold M. White,
By
Attorneys

Patented June 14, 1927.

1,632,719

UNITED STATES PATENT OFFICE.

HAROLD M. WHITE, OF DETROIT, MICHIGAN.

OVEN DOOR.

Application filed July 19, 1926. Serial No. 123,306.

This invention relates to oven doors, and has special reference to that class of ovens in which various kinds of edibles are baked, broiled, warmed or otherwise prepared. Such ovens are ordinarily provided with side supports or shelves, grids and the like. When roasting a fowl or other food it is often necessary to inspect the same and baste the fowl. This necessitates opening the oven door, withdrawing the roasting receptacle to a table or other support, and return to the roasting receptacle and the oven after inspection or baking. Obviously this is a warm and laborious operation.

My invention aims to furnish an oven door with a shelf, grid or other support for food to be prepared in the oven. In the instance cited, a roasting receptacle is supported from the inner side of the door and when the door is swung open easy access can be had to the roasting receptacle for inspecting or basting purposes.

My invention further aims to furnish an oven door with a plurality of supports or ledges for one or more detachable shelves, grids or the like, all of which are movable with the door and may be cleaned and maintained in a sanitary condition.

A still further object of this invention is to furnish an oven door with a shelf or grid support of such form that it will form a heat deflector for the open end of the oven, when the oven door is open, thus preventing considerable heat from escaping into a kitchen or other room. Such tends to maintain a normal temperature within the oven without the oven rapidly cooling indicent to the oven door being open.

There are two structural forms of my invention and both will be hereinafter specifically described and then claimed.

Reference will now be had to the drawing, wherein

Figure 1:
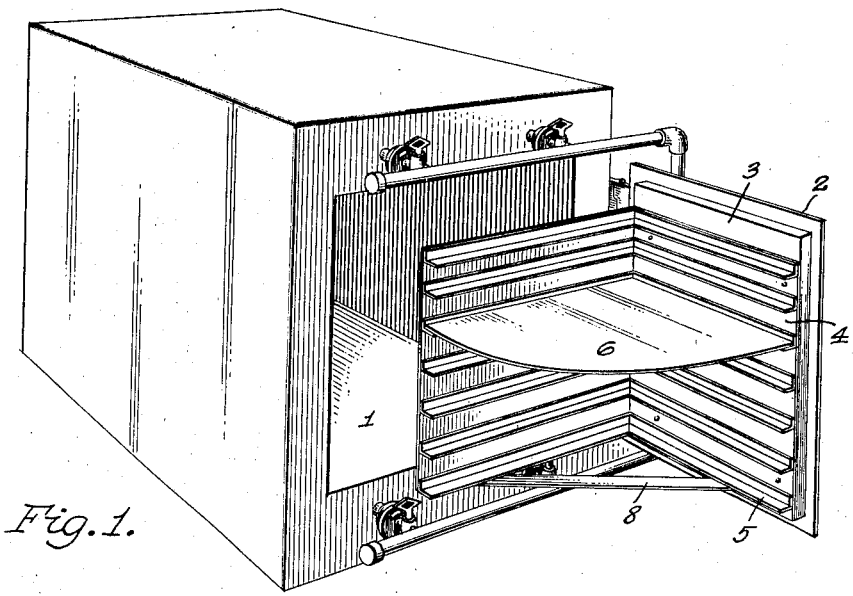
Figure 1 is a perspective view of a conventional form of oven with the door thereof open.

In the drawing, the reference numeral 1 denotes an oven compartment formed by insulated walls and a hinged or otherwise hung door 2 having an insulation panel 3. The oven compartment 1 may be heated by gas, oil, electricity or from a suitable source of heat circulated about the oven, and while shown as an individual unit it may form part of a range, stove or other structure.

Figure 2:
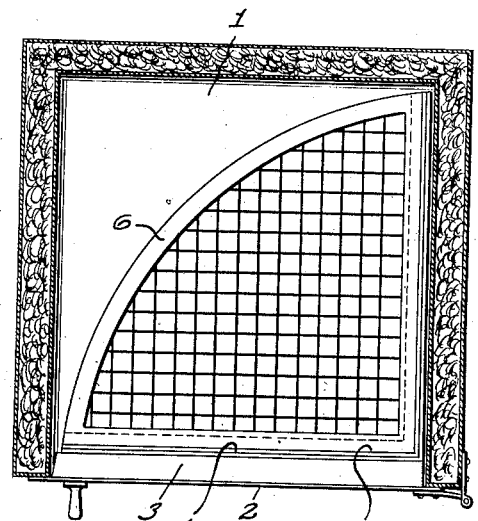
Fig. 2 is a horizontal sectional view of the oven with the door closed.

Riveted or otherwise attached to the panel 3 or some suitable part of the door 2 is an angular support 4 composed of two walls disposed substantially at a right angle to each other and preferably made of a single piece of rigid and durable material. Riveted or otherwise secured to the support 4 are a plurality of superposed angular ledges 5, and each ledge may be made of a single piece or strip of material bent to conform to the angular relation of the support walls. The ledges 5 are adapted to support one or more shelves 6, grids or the like, so that edibles, receptacles containing edibles, or other matter may be supported from the inner side of the door 2 and at a desired elevation within the oven compartment 1. The shelves 6 may be in the form of sector shaped plates having the angular disposed edges thereof resting on the ledges 5 and other edges curved or shaped to provide clearance for the doorway of the oven and at the same time afford a maximum supporting area for each shelf. A grid may be in the form of a frame provided with interwoven wire, as shown in Fig. 2, or any suitable foraminous structure may be placed on the ledges to afford supports.

Figure 3:
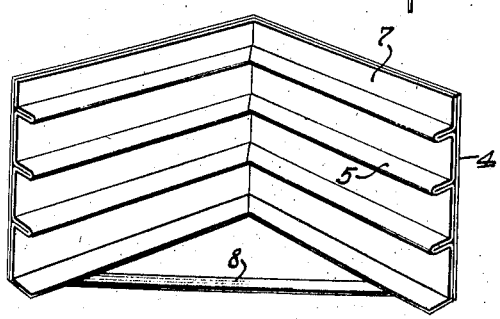
Fig. 3 is a perspective view of a modified form of shelf or grid support.

As shown in Fig. 3 the support 4 may have its ledges 5 formed by shaping a plate 7 to form two-ply ribs that will answer the purposes of ledges, and the lower edges of the plate 7 may form single ply ledges. In both instances the lowermost ledges may be connected by a bar or member 8 which will lend rigidity to the angular shape of the support 4.

With the oven door 2 open, as shown in Fig. 1, easy access is had to the shelf 6 or a grid. With the oven door closed there is still a small space in the back part of the oven compartment 1 so that a pot or other receptacle may be placed in the oven compartment for the preparation of food other than what is on the shelf or grid.

Figure 4:
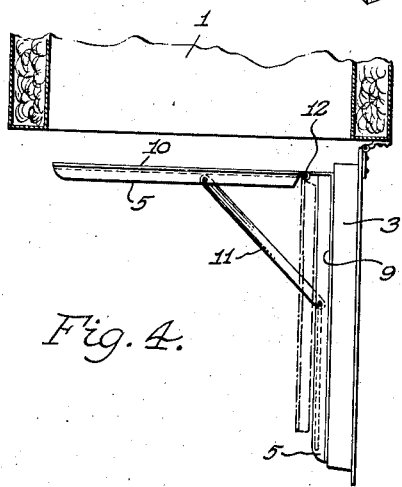
Fig. 4 is a plan of a modified form of oven door.

In Fig. 4 there is illustrated a modified form of oven door wherein the angle support is composed of a stationary section 9 attached to the door or door panel 3, and a movable section 10 that may be positioned at a right angle to the stationary section 9 or may be swung into parallelism therewith, as indicated by dot and dash lines. A detachable or swingable brace 11 or the like may be employed for holding the section 10 in an active position relative to the section 9, and both sections are provided with ledges 5, similar to the one-piece rigid support 4. The sections 9 and 10 are hingedly connected together, as at 12, and it is by virtue of the floating or swingable section 10 that the oven compartment 1 may be used independent of the door equipment. It is thus possible for the user of the oven to place my improvement in an inactive position so as not to interfere with the ordinary use of the oven, yet have the improvement convenient for such purposes as herein mentioned.

While in the drawing there are illustrated the preferred embodiments of my invention, it is to be understood that the structural elements are susceptible to such variations and modifications as fall within the scope of the appended claims.

What I claim is:—

1. The combination with an oven having a door, ledges supported from the door, a support hingedly connected to the inner side of the door and adapted to be swung in parallelism therewith, and ledges on said support adapted to cooperate with the door ledges in supporting shelves, grids or the like.

2. The combination called for in claim 1, and means adapted to retain said support at a right angle to said door.

3. An oven door having a fixed support, a movable support hinged to said fixed support, ledges carried by said supports, and a shelf adapted to be supported by said ledges.

In testimony whereof I affix my signature.

HAROLD M. WHITE.